G. ALLEN.
Spoke and Felloe Connection.
No. 79,533. Patented June 30, 1868.
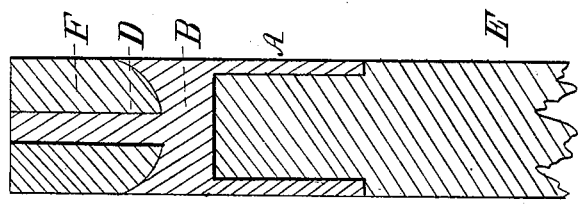
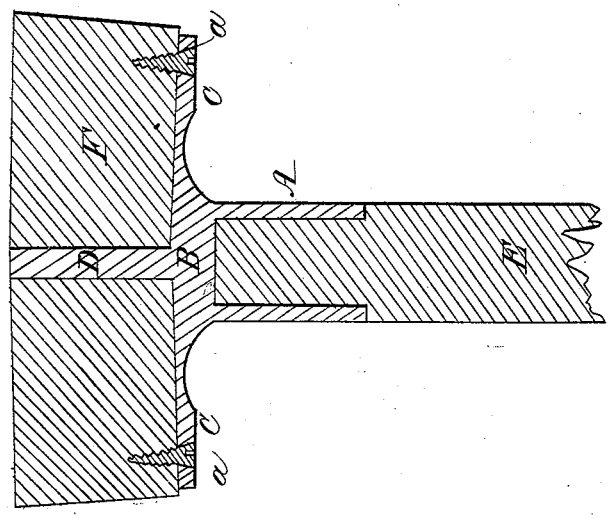
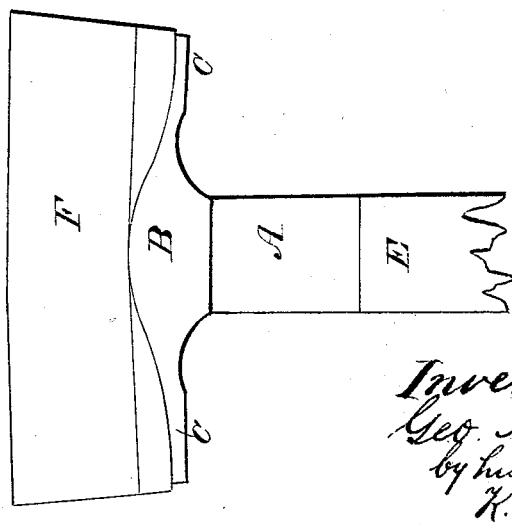
Witnesses.
F. P. Hale Jr
Frederick Curtis
Inventor.
Geo. Allen
by his attorney
K. H. Eddy

UNITED STATES PATENT OFFICE.

GEORGE ALLEN, OF WINCHESTER, MASSACHUSETTS, ASSIGNOR TO B. W. CONROY, OF PORT HURON, MICHIGAN.

IMPROVEMENT IN SPOKE AND FELLY CONNECTION.

Specification forming part of Letters Patent No. 79,533, dated June 30, 1868.

*To all persons to whom these presents shall come:*

Be it known that I, GEORGE ALLEN, a resident of Winchester, in the county of Middlesex and State of Massachusetts, have invented a new and useful Improvement in a Spoke and Felly Connection for Carriage-Wheels; and I do hereby declare the same to be fully described in the following specification, and represented in the accompanying drawings, of which—

Figure 1 is a side elevation; Fig. 2, a longitudinal section; and Fig 3 a transverse section, of it as applied to the felly and spoke of a wheel.

The connection in question is to be made of metal, and generally cast in one piece. It consists of a spoke socket or tube, A, a felly socket or rest, B, two wings or arms, C C, and a tenon, D. The spoke-socket projects from the felly-socket at right angles, and receives the head or end of a spoke, E, in manner as shown in Figs. 2 and 3. The felly F rests in the socket B, which is curved or made hollow transversely, for the reception of the inner face of the felly. The two wings rest against this inner face, and are perforated with holes *a a*, for the reception of screws, which are to go through the wings and screw into the felly. The tenon extends from the socket B and through the felly, and, by resting on its end directly against the tire, operates to so support the tire by the spoke, irrespective of the felly, as to materially relieve the connection-screws from strains of the felly. By the employment of the tenon with the tire to rest against it, the wheel will not only be rendered stronger, but will last much longer than it would without the tenon projecting from the felly-socket.

I claim—

The within-described device, consisting of the tubular socket A, the transversely-concave seat or rest B, the attaching-arms C C, and the tenon or projection D, the latter being formed or cast with the metallic connection, and extending entirely through the felly, in order to cause the tire to be supported by the said tenon D, substantially as and for the purpose set forth.

GEORGE ALLEN.

Witnesses:
R. H. EDDY,
F. P. HALE, Jr.